L. H. Gibbs,
Wood Auger.
Nº 13,261. Patented July 17, 1855.

UNITED STATES PATENT OFFICE.

L. H. GIBBS, OF WASHINGTON, DISTRICT OF COLUMBIA.

EXPANDING AUGER OR BIT.

Specification of Letters Patent No. 13,261, dated July 17, 1855.

*To all whom it may concern:*

Be it known that I, L. H. GIBBS, of the city of Washington, District of Columbia, have invented a new and useful Extension Auger or Bit; and I do hereby declare that the following is a full and exact description thereof, reference being had to the accompanying drawings and to the letters of reference marked thereon.

Figure 1:
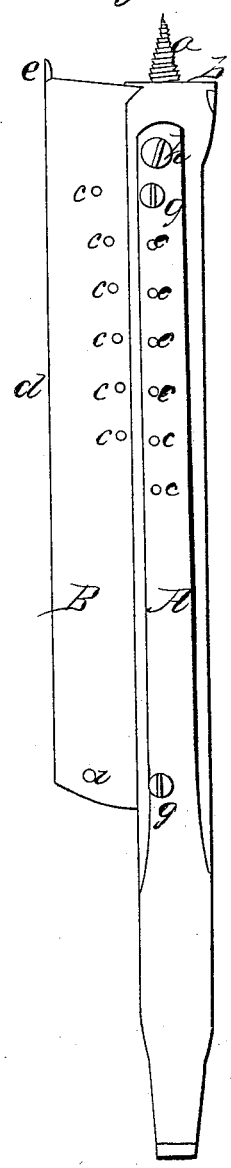
Figure 2:
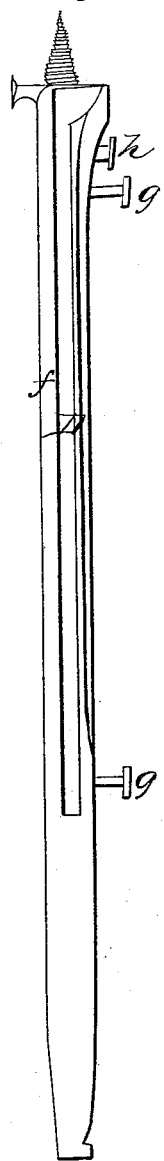
Figure 3:
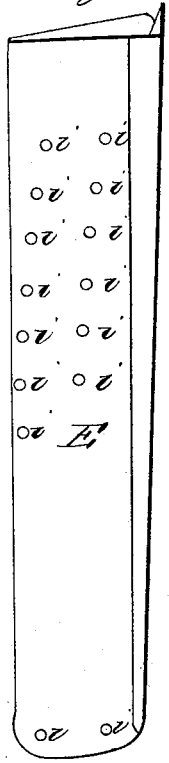
Figure 4:
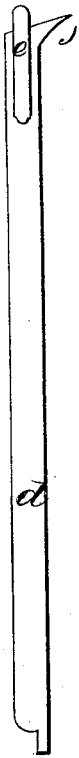

Figure 1, is a side view. Fig. 2, is a detached edge view of the auger. Fig. 3, detached side view of the extension section; Fig. 4, detached edge view of the extension section.

In Fig. 1, letter A is the auger; B, the extension plate; $a$, the screw; $b$, the cutting part of the auger; $c$, $c$, $c$, $c$, the index holes; $d$, the rib on the extension plate B; $e$, the movable spur.

In Fig. 2, $f$, is the edge view of the auger; D, the slot cut out of the auger; $g$, $g$, the movable tapering pins; $h$, the adjustable screw.

In Fig. 3, E is the extension section, side view; $i$, $i$, the holes for regulating the extension.

Fig. 4, is a detached edge view showing the rib $d$; $j$, the cutting lips; $e$, the movable spur.

To enable others skilled in the art to make and use my invention, I will proceed to describe its construction and operation.

In the construction of my extension auger or bit, Fig. 1, letter A, is the auger with the screw $a$, and cutting lip for clearing the hole in boring, and by itself acts as a common auger, and will bore (our present model) $\frac{3}{4}$ of an inch. They can be made of any required size. The slot D, is cut out of the augur to receive the extension plate B. The holes $c$, $c$, $c$, $c$, are index holes through which pass the movable tapering pins $g$, $g$, and are intended to hold the extension plate B at any given point required. The index holes in the plate B, are double and are regularly graduated so as to allow the bit to extend $\frac{1}{8}$ of an inch. So that any size can be obtained with mathematical accuracy by this bit of, from $\frac{3}{4}$ of an inch, to $2\frac{1}{2}$ inches; other bits can be made of larger, or smaller bore, as I may chose.

When I have thus set the extension plate to the width I wish to bore, the tapering pin, $g$, is driven in sufficiently tight to hold its place, and the adjustable set screw $h$ is tightened thus holding firmly the extension plate; if I wish to change the size I lightly tap the tapering pin, $g$ and it readily falls out, and by unscrewing screw $h$, the plate is easily moved, and then regulated as described above.

When the plate B is let into the auger, and the pin is in the hole at the top of the bit, and next the rib side of the same the bit will bore from 1 inch to $1\frac{1}{2}$ inches. To increase the bore I change the pin to the other hole at the top of the plate, and then use the other set of holes, near the inner edge of the plate, and change as before described, until I can make a hole of $2\frac{1}{4}$ inches diameter. I make my pins, $g$, $g$, tapering for the purpose of having them always fit tight, as they are to be moved frequently, and unless they be tapering would wear away and become loose. The spur $e$ is made adjustable and can easily be taken out by means of a hammer and punch, and another replaced if it be worn out or broken.

Having thus fully described my invention what I claim as new and desire to secure by Letters Patent is:

The adjustable plate B, with the rib $d$, the lip $j$, the index holes $c$, $c$, $c$, $c$, in it, combined with the auger A, with slot D the tapering pins $g$, $g$, and set screw $h$, as herein described, and for the purposes set forth.

L. H. GIBBS.

Witnesses:
 JOSH. B. McCOMB,
 JOS. C. YOUNG.